United States Patent [19]

Zegers

[11] 3,781,795

[45] Dec. 25, 1973

[54] ERROR-CORRECTING DATA TRANSMISSION SYSTEM

[75] Inventor: Leo Eduard Zegers, Emmasingel, Eindhoven, Netherlands

[73] Assignee: U.S. Philips Corporation, New York, N.Y.

[22] Filed: May 15, 1972

[21] Appl. No.: 253,429

[30] Foreign Application Priority Data

May 18, 1971 Netherlands ........................ 7106776

[52] U.S. Cl. ........................................ 340/146.1 BE
[51] Int. Cl. ........................................ G06f 11/08
[58] Field of Search ........................... 340/146.1 BE; 325/41

[56] References Cited

UNITED STATES PATENTS

| | | | |
|---|---|---|---|
| 3,195,048 | 7/1965 | Adams et al. | 340/146.1 BE |
| 3,409,875 | 11/1968 | De Jager et al. | 340/146.1 BE |
| 3,500,319 | 3/1970 | Van Duuren et al. | 340/146.1 BE |
| 3,526,837 | 9/1970 | Zegers et al. | 325/41 |

*Primary Examiner*—Charles E. Atkinson
*Attorney*—Frank R. Trifari

[57] ABSTRACT

An error-correcting data transmission system in which two versions of the same data are transmitted from a transmitter station to a receiver station via two channels having a mutual time difference, and in which a coded version of the non-delayed data is added to the delayed data before transmission as well as after reception. At the receiver side a syndrome signal is calculated by adding, after a corresponding delay, the non-delayed data to the delayed data. The syndrome signal is applied to a syndrome analyzer which makes a distinction between simple error patterns in the first channel, simple error patterns in the second channel, and error bursts. An error correction circuit is provided for correcting simple error patterns in the first channel. Error bursts are corrected by connecting the data collector alternately to the first and the second channel.

3 Claims, 5 Drawing Figures

ERROR-CORRECTING DATA TRANSMISSION SYSTEM

The invention relates to an error-correcting data transmission system, comprising a data source, a two-channel transmitter, a two-channel receiver, a data collector, and a transmission path between the transmitter and the receiver. In this system which the data source is connected to the input of the first channel of the transmitter, to the input of a first delay register, and to the input of a first linear sequential coding network comprising forward-coupling paths. The output of the first delay register and the output of the first coding network are connected to a first module-two adder, the output of which is connected to the input of the second channel of the transmitter. The output of the first channel of the receiver is connected to the input of a second delay register, having the same delay time as the first delay register, and to the input of a second coding network, having the same transfer function as the first coding network. The output of the second channel of the receiver and the output of the second coding network are connected to a second modulo-two adder. The output of the second delay register and the output of the second modulo-two adder are connected to a third modulo-two adder, comprising a two-position switching unit for connecting the data collector to the output of the second delay register in the first position, and for connecting the data collector to the output of the second modulo-two adder in the second position. The third modulo-two adder also comprises a control unit, provided with an input for the syndrome digits supplied by the third modulo-two adder, for temporarily setting the switching unit to the second position after expiration of a predetermined period of time after the instant of appearance of an indication of the beginning of an error burst.

Applicant has described an error-correcting data transmission system of this kind in U.S. Pat. No. 3,409,875. This known system is adapted for correcting error bursts as they occur during transmission of data via telephone channels. In practice it is found that not only error bursts occur in telephony channels, but also single errors, and that for an error-correction scheme to be effective it would have to comprise different correction algorithms for different types of error. Error-correction schemes are known which comprise different correction algorithms for error bursts and single errors. Such correction schemes are called adaptive. An adaptive error-correcting data transmission system for convolution codes is known from U.S. Pat. No. 3,469,236.

The invention has for its object to extend the error-correcting data transmission set forth into an adaptive system.

The error-correcting data transmission system according to the invention is characterized in that the control unit comprises a syndrome register which receives the syndrome digits as its input signal, a pattern-recognition unit being connected to the syndrome register for making a distinction between and to provide an indication of, firstly, simple error patterns, in particular single errors in the first receiver channel, secondly, simple error patterns, in particular single errors in the second channel of the receiver and, thirdly, error bursts. An error-correction circuit, responsive to the indication of a simple error pattern in the first receiver channel is provided for correcting a digit in the second delay register which is affected by the indicated error pattern.

This system offers the advantage that in principle no error propagation occurs during error correction. Error propagation is to be understood to mean that undue error correction has an effect on a sequence of information digits such that the error propagates itself. In the system described in the said U.S. Pat. No. 3,469,236, in principle error propagation occurs due to the use of convolution code decoders provided with feedback.

The invention and its advantages will be described in detail with reference to the figures.

Figure 1:
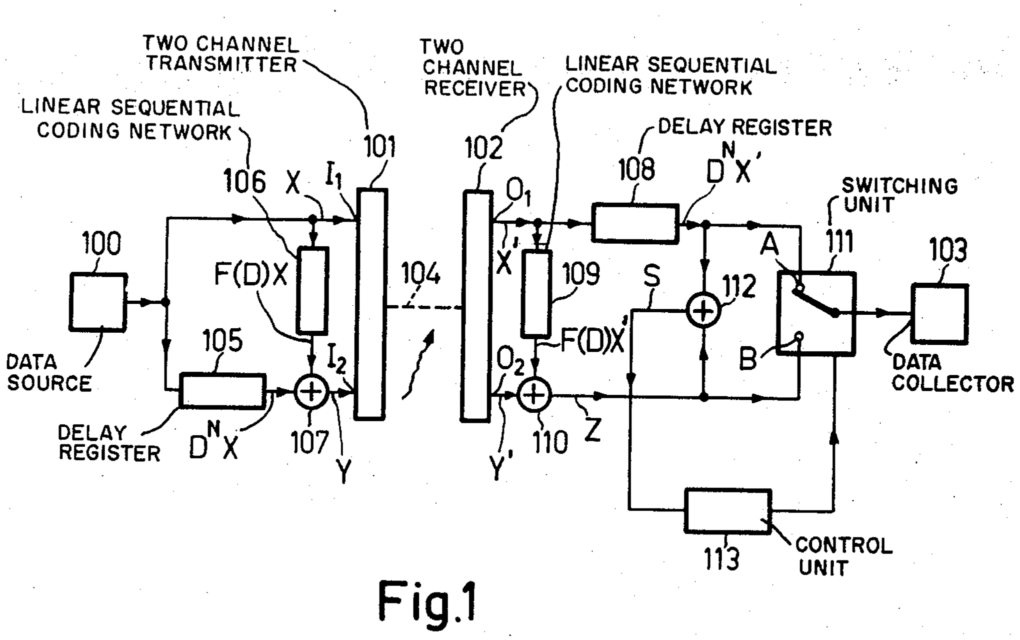
FIG. 1 is a block diagram of a known error-correcting data transmission system.

FIG. 1 is a block diagram of an error-correcting data transmission system. The system comprises a data source 100, a two-channel transmitter 101, a two-channel receiver 102, a data collector 103, and a transmission path 104 between the transmitter and the receiver. The data to be transmitted are assumed to consist of a sequence of binary digits, which will be referred to as information digits. It is furthermore assumed that a synchronous transmission mode is used, that is to say, the information digits are transmitted in synchronism with a clock and are received in synchronism with a clock, the latter clock being kept synchronized with the transmitter clock by a separately transmitted synchronization signal or by the data signal itself. The clock is not shown in the figures. However, it is to be understood that a clock of this kind is provided for determining the instants at which digits are transmitted and received, and for controlling the registers, counters and the like of the system.

The transmitter 101 and the receiver 102 may be of an arbitrary type which are capable of establishing two communication channels between the transmitter station and the receiver station. Each communication channel must permit the transfer of a digit sequence at the same digit frequency for each channel. The two channels are preferably, though not exclusively, time-derived by using time multiplex. In this case a digit of the one channel and a digit of the other channel are alternately transmitted via the transmission path 104. The channel terminal of the transmitter 101 are denoted in FIG. 1 by $I_1$ and $I_2$, and the channel terminals of the receiver 102 are denoted by $O_1$ and $O_2$, these terminals being referred to hereinafter as channel inputs and channel outputs, respectively. $I_1$ and $O_1$ are associated with each other and so are $I_2$ and $O_2$. The channel between $I_1$ and $O_1$ is referred to as the first channel, and the channel between $I_2$ and $O_2$ as the second channel. The time delay in the transmission of a digit from channel input $I_1$ to channel output $O_1$ is assumed to be equal to the time delay of the second channel.

The transmission medium is an arbitrary one, and is, for example, a switched telephone connection, in which case the transmitter 101 comprises suitable modulation equipment for converting the digital data signal, supplied by the multiplexer, into a form which is suitable for transmission, the receiver comprising corresponding demodulation equipment.

Disturbances can influence the transmission path 104 such that errors occur. A digital error occurs if a contradiction exists between the received information digit and the transmitted information digit. Investigations of telephone connections have shown that the errors usually occur in groups which are called error bursts. In U.S. Pat. No. 3,409,875, Applicant describes an error-correcting data transmission system in which provisions are taken so as to correct error bursts. This known system will first be described with reference to FIG. 1. Each digit of data source 100 is applied to the channel input $I_1$, to the input of a delay register 105, and to the input of a linear sequential coding network 106. Each output digit of coding network 106 is added in modulo-two adder 107 to the output digit of delay register 105, the sum being applied to the channel input $I_2$. In the receiver station each digit of channel output $O_1$ is applied to the input of the delay register 108, and to the input of a linear sequential coding network 109. Each output digit of coding network 109 is added in modulo-two adder 110 to the digit of channel output $O_2$. Each output digit of the delay register 108 is applied to a first input of a switching unit 111, each output digit of modulo-two adder 110 being applied to a second input of switching unit 111. The input of data collector 103 is connected to the output of switching unit 111. In position A of switching unit 111 the output digits of delay register 108 are applied to the data collector, the output digits of modulo-two adder 110 being applied to the data collector in position B.

Each output digit of the delay register 108 is added in modulo-two adder 112 to the output digit of modulo-two adder 110. The output digits of modulo-two adder 112 are the syndrome digits. The latter are applied to a control unit 113 which controls the switching unit 111.

The delay registers 105 and 108 have the same delay time which is expressed in the number of digit positions by which a digit sequence is delayed, and which is denoted by N. The optimum value of N depends on the length of the error bursts and may have a value in the range of 100 to 500 for a transmission rate of 1,200 Bd.

The coding networks 106 and 109 are identical linear sequential coding networks with forward coupling paths. This type of coding network is described by D.A. Huffman in Information Theory, Colin Cherry (Ed), Academic Press, New York (1956), pages 77–95. Coding networks of this kind are composed of delay elements, each of which causes a delay which corresponds to one digit position, modulo-two adders and forward coupling paths. The output digit of such a coding network is the modulo-two sum of the non-delayed input digit and a plurality of delayed input digits and behaves as if it were the parity-checking digit of the input digit and a plurality of preceding input digits.

First a general description will be given of the known error-correcting data transmission system. Each digit transmitted by data source 100 is transmitted to the receiver station via the first and the second communication channel. The digit which is transmitted via the first communication channel is delayed by N digit positions by delay register 108 in the receiver, while the digit which is transmitted via the second communication channel is delayed by N digit positions by delay register 105 in the transmitter. The digit which is transmitted via the first communication channel arrives on the output of delay register 108 in the same digit position as that in whcih the digit transmitted via the second communication channel arrives on the output of modulo-two adder 110. The same parity-checking digit is added twice in succession to the digit transmitted via the second communication channel, i.e., in modulo-two adder 107 and in modulo-two adder 110, so that the digit itself remains. The digit sequences appearing on the output of delay register 108 and on the output of modulo-two adder 110 are digit-synchronous, and are identical versions of the digit sequence transmitted by the data source 100.

A disturbance which influences the transmission path 104 becomes apparent N digit positions later on the output of delay register 108, but becomes directly apparent on the output of modulo-two adder 110. By controlling the switching unit 111 such that it is set to position B before the disturbance becomes apparent on the output of delay register 108 and after the effect of the disturbance on the output of modulo-two adder 110 has ceased, the disturbance will be eliminated from the digit sequence which is applied to the data collector 103. Error correction is then realized by elimination of the periods in which disturbances occur. So as to be correctable, the disturbance periods must comprise less than N digit positions. Otherwise, the disturbance on the output of modulo-two adder 110 has not yet disappeared at the instant that the disturbance appears on the output of delay register 108. The initial state is restored by setting the switching unit 111 to position A after termination of the disturbance on the output of delay register 108.

The known error correcting data transmission system will now be described in detail, utilizing given symbols to denote digit sequences and operations which are performed on digit sequences.

Hereinafter, X denotes the digit sequence of data source 100, $D$ denotes the Huffman delay operator and $F(D)$ denotes the transfer function of the coding networks 106 and 109. $F(D)$ can be written as a polynomial of the operator $D$, in which each + sign represents a summation modulo-two. For example, $F(D) = 1 + D^3 + D^5$. The symbol $D^m$ is an algebraic operator, the effect of which is that it delays the variable on which the operator acts by $m$ digit positions. The transfer function of the delay registers 105 and 108 can be written as $D^N$.

X' denotes the digit sequence appearing an channel output $O_1$ in reaction to the supply of the digit sequence X to the channel input $I_1$. The transmission time of a digit from channel input $I_1$ to channel output $O_1$ is eliminated in the considerations by assuming that a digit which is transmitted in a given digit position with respect to the transmitter clock is received in the same digit position with respect to the receiver clock. If no errors occur, $X' = X$. If errors occur, $X' = X+E_1$, in which the + sign represents a summation modulo-two, $E_1$ representing the error sequence of the first communication channel. An error sequence is a sequence of zeros and ones, comprising a one for an error and a zero for no error in the corresponding digit position. The elements of an error sequence are referred to as error digits. Hereinafter, $Y$ denotes the digit sequence appearing on channel input $I_2$, $Y'$ denotes the digit sequence appearing on channel output $O_2$, and $E_2$ denotes the error sequence of the second communication channel.

The following relations exist:

$$X' = X + E_1 \quad (1)$$

$$Y = F(D)X + D^N X \quad (2)$$

$$Y' = Y + E_2 \quad (3)$$

$$Z = Y' + F(D)X' \quad (4)$$

$$S = Z + D^N X' \quad (5)$$

Therein, Z denotes the digit sequence on the output of modulo-two adder 110, and $S$ denotes the sequence of syndrome digits on the output of modulo-two adder 112. Substitution of the relations (1), (2) and (3) in the relation (4) and use of the rule of modulo-two addition according to which $F(D)X + F(D)X = 0$, gives the following relation:

$$Z = D^N X + E_2 + F(D)E_1 \quad (4_a)$$

Substitution of the relations (1) and (4*a*) in the relation (5) and use of the rule of modulo-two addition according to which $D^N X + D^N X = 0$, gives the relation:

$$S = E_2 + F(D)E_1 + D^N E_1 \quad (5a)$$

As appears from the relation (4*a*), if no errors occur, the digit sequence on the output of the delay register 108, (equal to $D^N X$ in this case) is identical to the digit sequence Z appearing on the output of the modulo-two adder 110. It also follows from relation 5*a* that in this case the syndrome digit sequence is composed of a sequence of zeros.

A first error is defined to be an error which appears after at least N information digits have been correctly received via the first communication channel. If a first error occurs, there will be no errors in the delay register 108 at that instant and relation 5a is reduced to:

$$S = E_2 + F(D)E_1 \quad (5b)$$

for the first N digit positions as of and including the digit position of the first error.

The two communication channels are coupled via the coding networks 106 and 109 so as to achieve that the error sequence $E_1$ also occurs in the syndrome sequence S, so that errors which occur only in the first communication channel will not remain undetected.

A given probability exists that the errors in the two communication channels eliminate each other upon the formation of the syndrome sequence according to relation (5*b*) during a period covering a plurality of digit positions of the syndrome sequence. This probability is high if the communication channels are directly coupled, in which case $F(D) = 1$, and the error sequences $E_1$ and $E_2$ comprise patterns of zeros and ones which mutually differ only little, the latter assumption being applicable if the disturbances are not selective as regards the two channels. In that case the position of the first one in the syndrome sequence is not a reliable indication of the start of an error burst. So as to avoid elimination of errors, the coding networks 106 and 109 are used. As appears from relation (5*b*), the transformed error sequence $F(D)E_1$ then appears in the modulo-two sum of the syndrome sequence. $F(D)$ is then chosen to be such that the probability that the error sequences $E_1$ and $E_2$ in the relation (5*b*) eliminate each other during a given number of digit positions is below a given value for the relevant error frequencies. Hereinafter, this given number of digit positions is denoted by $n$, $n$ being assumed to be equal to 22 in the below example. A suitable polynomial for this value of $n$ is:

$$F(D) = 1 + D^{11} + D^{13} + D^{16} + D^{17} + D^{19} + D^{20} + D^{21} \quad (6)$$

The probability that the beginning of an error burst is not detected within a period of $n = 22$ digits in the syndrome sequence is less than $10^{-6}$ for all error frequencies below 0.5, if use is made of the polynomial according to relation (6).

In the known system, a first one of the syndrome sequence actuates control unit 113 which, in reaction thereto, switches over the switching unit 111 according to a fixed procedure. Switching unit 111 is first held in position A for a given number of digit positions, denoted by $p$, after which it is set to position B for a given number of digit positions, denoted by $q$, and is subsequently reset to position A. Control unit 113 is insensitive to ones appearing in the syndrome sequence while this switching procedure is being performed. The numbers $p$ and $q$ are of the same magnitude as the number N. For determining $p$, it is assumed that elimination of errors may have occurred during a given period prior to the first one of the syndrome sequence. By using the coding networks 106 and 109, the probability that the beginning of an error burst is not detected in a period of $n = 22$ digit positions is reduced to a value below $10^{-6}$. The period preceding the first one of the syndrome sequence, in which error elimination is assumed to occur, can then be determined to be 21 digit positions. The assumption is then that the beginning of an error burst is not situated in digit position $i$ of a first one of the syndrome sequence but in digit position $i$–21. In other words, it is assumed that a first error occurs in digit position $i$–21.

Hereinafter, $x'_i$ denotes the digit which appears on the channel output $O_1$ in digit position $i$. The digit appearing on the output of the delay re-gister 108 in this digit position is the digit $x'i$–N. The digit position $i$ is the position of a first one of the syndrome sequence. On the basis of the aforesaid assumption it is assumed that the digit $x'i$–21 is the first false digit. This digit appears on the output of the delay register 18 in digit position $i$–21+N, so that switching unit 111 must be set to position B no later than at the end of the preceding digit position $i$–21+N. Switching unit 111 may then remain in position A as of the beginning of the position $i$ till digit position $i$–22+N inclusive, which means during N–21 digit positions. This value N–21 is the maximum value which can be allocated to p. Values smaller than N–21 increase the certainty that no incorrect digits are applied to the data collector, but reduce the system's ability to correct long error bursts.

The value of $q$ will be more closely determined in what follows. The switching unit 111 is in position B from the beginning of digit position $i$—21+N to digit position $i$—22+N+$q$ inclusive. As of digit position $i$—21+N+$q$, switching unit 111 is in position A again.

For further reference, the switch-over procedure is noted down in brief as follows:

position A: digit position $i$,—, $i$—22+$N$; $p$=$N$—21 (7.1)

position B: digit positions $i-21+N,-,i-22+N+q$; $q$ (7.2)

position A: as of digit position $i$—21+$N$+$q$ (7.3)

Therein, $i$ is the digit position of a first one of the syndrome sequence.

The following digits are applied to the data collector 103 during the switch-over procedure:

position A: digits $x'_{i-N}$ , —, $x'_{i-22}$ (8.1)

position B: digits $z'_{i-21+N}$, —, $z'_{i-22+N+q}$ (8.2)

position A: as of digit $x'_{i-21+q}$ (8.3)

If the assumption that $x'_{i-21}$ is the first false digit is correct, no errors will be applied to the data collector in position A (8.1) In view of the relations (4$a$) and (6), the digits applied to the data collector in position (8.2) are subject to the following relations (9.1, —, 9.$q$), only the first and the last one thereof being shown, in which $e_1$ denotes a digit of error sequence $E_1$, $e_2$ a digit of error sequence $E_2$, the expression placed between parentheses denoting the result of the operation of the operator polynomial F(D) on the error sequence $E_1$. For the sake of brevity, the expressions contain only the results of the operations of the first and the last term of the polynomial F(D).

$$z'_{i-21+N}=x_{i-21}+e_{2,i-21+N}+(e_{1,i-21+N}+—+e_{1,i-42+N}) \quad (9.1)$$

$$z'_{i-22+N+q}=x_{i-22+q}+e_{2,i-22+N+q}+(e_{1,i-22+N+q}+—+e_{1,i-43+N+q}) \quad (9.q)$$

An error-free transfer to the data collector 103 is realized if all error digits appearing in the relations (9.1, —, 9.q) are zeros, and if the error digits $e_1$, in view of (8.3), are zeros as of the error digit $e_{1,i-21+q}$. If the distinction between the error sequences $E_1$ and $E_2$ is neglected ($e_1 = e_2$), the first condition is satisfied if the error digits $e_{i-42+N}$, —, $e_{i-22+N+q}$ are zeros. At the same time the second condition is then satisfied if $q \geq$ N—21; $q$ is suitably chosen to be equal to N—21. Using this value of $q$, it is achieved that the error digits $e_{i.21}$, —, $e_{i-43+N}$ may have an arbitrary value and that the error digits $e_{i-42+N}$, —, $e_{i-43+2N}$ must have the value zero. The first of these digit sequences is the error burst, and the second forms the error-free guard space following the error burst.

The result can be described in other words as follows. An error burst having a burst length of N—21 digit positions which is followed by an error-free guard space of N digit positions is fully corrected by the fixed switch-over procedure.

The switch-over period of switching unit 111 covers the digit positions $i$ to $i$—43+2N inclusive. As of digit position $i$—42+2N, switching unit 111 is in position A (7.3) and control unit 113 is sensitive again to a first one in the syndrome sequence. The switchover period covers 2N—42 digit positions, and this is at the same time the minimum distance between two correctable error bursts. If $i$ has a value such that a number of the digit positions $i$—21, —, $i$—1 are situated in the guard space following the previous error burst, the burst length of the second error burst must be smaller than N—21 by the same number of digit positions so as to be fully correctable.

In the foregoing, the limits within which error correction using the fixed switch-over procedure is possible are accurately defined. By using the coding networks 106 and 109 it is ensured that the probability that the beginning of an error burst is not detected in time is smaller than a given low highest permissible value, in this case less than $10^{-6}$. This probability can be reduced further, if desired, by using polynomial F(D) of a still higher degree.

An essential improvement of the known error-correcting data transmission system can be realized by replacing the fixed switch-over procedure by an adaptive switch-over procedure. An adaptive switch-over procedure is to be understood to mean a switch-over procedure which is adapted to the nature of the errors. In particular, a switch-over procedure will be considered which adapts itself to the burst length. In the known system the switch-over procedure is started by a first one of the syndrome sequence. The digit position thereof is denoted by $i$ and it is assumed that the first error appeared in digit position $i$.21. After the switch-over procedure has been started, it is completed by itself. A first error is defined to be an error which appears after N correct information digits have been received. During the switch-over procedure the control unit 113 is insensitive to ones so that a first one is a one which is received by control unit 113 when the latter is sensitive thereto.

So as to describe the adaptive switch-over procedure, the idea of a first zero of the syndrome sequence is introduced. A first zero is a zero which occurs after a first one and which is followed by a given number of zeros. The latter number is assumed to be $n$—1, where $n$—1 is the highest exponent occurring in polynomial F(D). Consequently, if an uninterrupted sequence of $n$ zeros appears after a first one, the first zero thereof is denoted as the first zero. The digit position of a first zero is denoted by $j$. The meaning of a first zero is that it very probably denotes the end of the error burst, i.e., the beginning of the guard space. This will first be considered in detail. A first zero is considered only if it appears in one of the digit positions preceding the digit position $i$—42+N. This is because an error burst must in any case terminate no later than in digit position $i$—43 +N so as to be fully correctable. If this is not the case, in other words $j$ is not smaller than $i$—42 +N, than the fixed switch-over procedure is followed. For the values of $j$ under consideration the relation (5$b$) applies. The syndrome digit in digit position $j$ is denoted by $s_j$. According to relation (5$b$):

$$s_j = e_{2,j} + (e_{1,j} + — + e_{1,j-21}) \quad (10.1)$$

$$s_{J+21} = e_{2J+21} + (e_{1J+21} + — + e_{1J}) \quad (10.22)$$

The syndrome digit $s_j$ is a first zero if all syndrome digits $s_j$, —, $s_{j+21}$ are zeros. This condition is satisfied if all error digits $e_1$ and $e_2$ present in the relations (10.1, —, 10.22) are zeros. Ignoring the difference between the error sequences $E_1$ and $E_2$, it may be stated that the syndrome digit $s_j$ is a first zero if the error digits $e_{j-21}$, —, $e_{j+21}$ are zeros. This is a sequence comprising 43 zeros. The probability that error elimination produces an uninterrupted sequence of $n = 22$ zeros in the syndrome sequence during the error burst, is of the same small value as the probability that the beginning of an error burst is not detected within a period of $n = 22$ digit positions. This probability is less than $10^{-6}$ for all error frequencies smaller than 0.5.

On the basis of the assumption that $s_j$ is a first zero, it is assumed that digit $x'_{j-1}$ is the last falsified digit. This digit arrives in digit position $j$—1+N on the output of the delay register 108. As regards the first part, the adaptive switch-over procedure is identical to the fixed switch-over procedure (7.1). According to the adaptive switch-over procedure, however, the position B of switching unit 111 is terminated at the end of digit position $j$—1+N. Consequently, the adaptive switch-over procedure is then:

position A: digit positions $i$, —, $i$—22+N (11.1)

position B: digit positions $i$—21+N, —, $j$—1+N (11.2)

position A: as of digit position $j$+N (11.3)

For the case that $j$ is not smaller than $i$—42+N, the fixed switch-over procedure is followed. In the same manner as with the fixed switch-over procedure, it can be deduced for the adaptive switch-over procedure that the error digits $e_j$, —, $e_{j-1+N}$ must be zeros so as to enable full correction of the error burst which is formed by the error digits $e_{i-21}$, —, $e_{j-1}$. The first sequence constitutes the guard space of N digit positions. The error burst has a length of $j$—$i$+21 digits which is denoted by L. This result can be described as follows: an error burst having a burst length of L digit positions which is followed by a guard space of N digit positions is fully corrected by the adaptive switch-over procedure.

The adaptive switch-over procedure covers the digit positions $i$ to $j$—1+N inclusive. These are $j—i+N = N+L—21$ digit positions, and this is at the same time the minimum distance between two correctable error bursts. If $i$ has a value such that a number of the digit positions $i$—21, —, $i$—1 are situated in the guard space following the preceding error burst, the burst length of the second error burst must be an equal number of digit positions smaller than L so as to be fully correctable. If $j = i—42+N$, $L=N—21$, and the same result is obtained as when use is made of the fixed switch-over procedure.

The advantage of the adaptive switch-over procedure is that the minimum distance between two correctable error bursts is smaller than in case of the fixed switch-over procedure, if the burst length is less than N—21. Using the adaptive switch-over procedure, error bursts which have a small burst length and which follow each other closely can be corrected as well as error bursts of a longer burst length and following each other less closely.

It has been shown in practice that not only error bursts occur in telephone channels, but also random errors. Error bursts correspond to transmission periods of an increased error frequency. The random errors occur in the periods between the error bursts in which the error frequency has a lower value. An essential improvement of an error-correcting data transmission system is realized by using two correction algorithms, one of which is suitable for correcting error bursts, the other being suitable for correcting random errors. In the known and in the adaptive error-correcting data transmission system described thus far, one correction algorithm is used which is suitable for correcting error bursts. This correction algorithm is performed by the switch-over procedure. This algorithm is also used for correcting random errors. Performing this algorithm for a random error, however, requires as much time as for an error burst, so that the correction efficiency of the system is reduced by the appearance of random errors. Consequently, it is advantageous to use a separate correction algorithm for correcting random errors. Error-correcting systems utilizing two correction algorithms are referred to as adaptive systems in literature. The adaptive system described thus far is adaptive as regards the burst length. If two correction algorithms are used in the latter system, a double-adaptive system is obtained.

Single errors will now be considered as a first step towards realization of a correction algorithm for random errors. A single first error is here defined as a first error which is followed by $n$—1 correct digits; $n$—1 being the highest exponent occurring in the polynomial F(D). A first error is an error which is preceded by N correct digits. If a single first error is corrected, the next single first error can already occur at a distance of $n$ digit positions with respect to the corrected single first error.

The syndrome sequence for a single first error is given by the relation (5$b$):

$$S = E_2 + F(D)E_1 \quad (5b)$$

The digit position of a single first error is denoted by $k$. Using the polynomial $F(D)$ according to (6), the following syndrome sequence is obtained as of the digit position $k$ for a single first error in the first communication channel:

1000000000010100110111 (22 bits)

This characteristic sequence starts in digit position $k$ and terminates in digit position $k$+21. Another characteristic sequence can start in the digit position $k'=k+22$. This characteristic sequence is denoted as the first characteristic sequence.

The characteristic syndrome sequence for a single first error in the second communication channel is:

1000000000000000000000 (22 bits)

This characteristic sequence is denoted as the second characteristic sequence.

The probability that these characteristic syndrome sequences are initiated by phenomena other than single errors, for example, by the beginning of an error burst, is extremely small. This probability is less than $10^{-6}$ for all error frequencies below 0.5.

An extension to other simple error patterns is straight forward. For example, the characteristic syndrome sequences can also be determined for double errors, and so on. However, in that casee the equipment for performing the correction algorithm will readily become very extensive. For this reason, the following description is limited to single errors only. It is to be noted that the use of a correction algorithm for single errors results in a substantial improvement of the correction efficiency and that an extension to cover double errors results in only a marginal improvement.

The correction algorithm for random errors is that the digit $x'_k$, present in the delay register 108, is corrected when control unit 113 is in the initial position and the first characteristic sequence is detected. When control unit 113 is in the initial position and the second characteristic sequence is detected, no error correction is performed. When control unit 113 is in the initial position, the switching unit 111 is in position A and the transfer of digits to the data collector 103 is not influenced by errors which occur exclusively in the second communication channel. Consequently, these errors need not to be corrected. The correction algorithm for error bursts is performed only if the zeros and ones of the syndrome sequence occur in patterns other than those of the two characteristic sequences.

Figure 2:
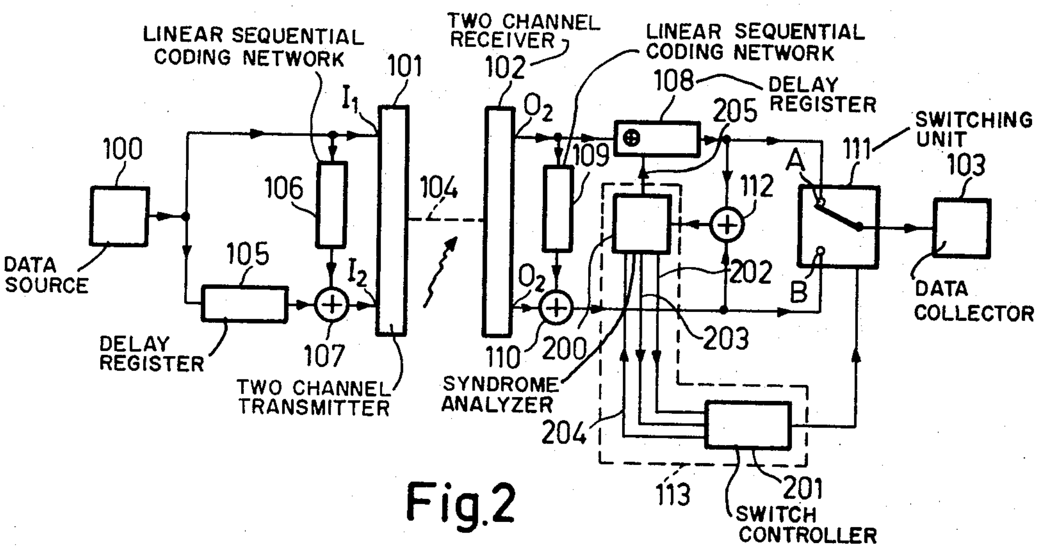
FIG. 2 is a block diagram of the adaptive error-correcting data transmission system according to the invention.

FIG. 2 is a block diagram of the adaptive error-correcting data transmission system according to the invention. Corresponding parts in FIGS. 2 and 1 are denoted by the same references. The adaptive system shown in FIG. 2 differs from the system shown in FIG. 1 as regards the construction of control unit 113 and the incorporation of a modulo-two adder in delay register 108. The latter is used in view of the correction algorithm for random errors. The control unit 113 shown in FIG. 2 is composed of two main portions, i.e., a syndrome analyzer 200 and a switch controller 201. The syndrome analyzer serves to make a distinction between and to indicate, firstly, single errors in the first communication channel, secondly, single errors in the second communication channel and, thirdly, error bursts. The syndrome analyzer 200 is connected to the switch controller 201 via two lines 202 and 203. Via line 202, a signal is transmitted when the beginning of an error burst is detected, a signal being transmitted via line 203 when the end of the error burst, i.e., the beginning of the guard space, is detected. In the reverse direction, the switch controller 201 is connected to the syndrome analyzer 200 via line 204. While the correction algorithm for error bursts is being performed, no signal is returned via this line to the syndrome analyzer so as to inhibit the correction algorithm for random errors.

The syndrome analyzer 200 is connected to the delay register 108 via line 205. A signal is transmitted via this line when the correction algorithm for random errors is performed.

Figure 3:
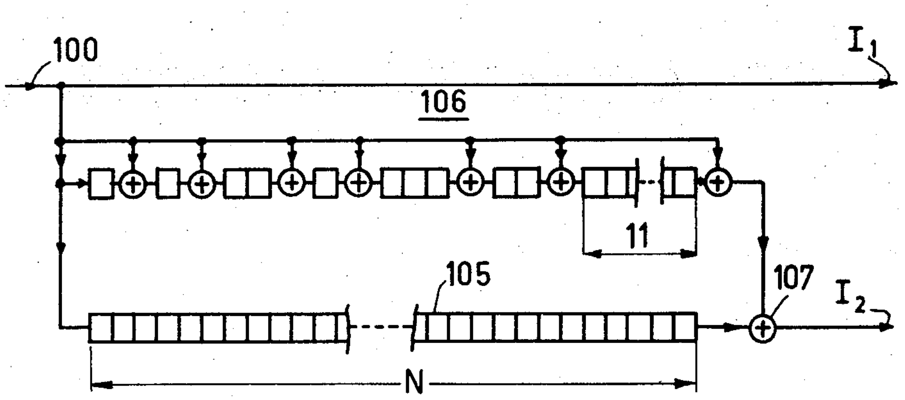
FIG. 3 is a logic diagram of a portion of the transmitter station of the system shown in FIG. 2.

FIG. 3 is a logic diagram of a portion of the transmitter station and shows the connections to the data source 100 and the channel inputs $I_1$ and $I_2$ of transmitter 101. The delay register 105 is composed of a tandem connection of N synchronous delay stages, each of which causes a delay of one digit position. The coding network 106 is composed of a tandem connection of 21 synchronous delay stages comprising modulo-two gates which are connected between selected delay stages and between the last delay stage and the output. The input is connected to each of the modulo-two gates. The transfer function F(D) of this forward-coupled shift register is given by relation (6).

Figure 4:
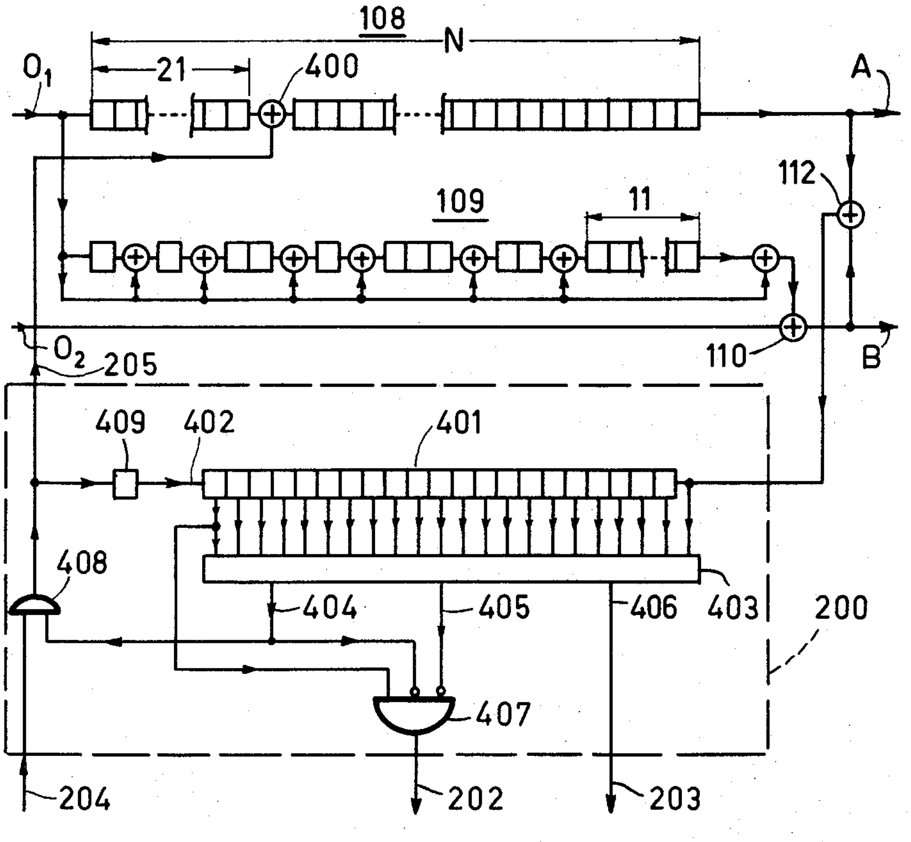
FIGS. 4, 5 show a logic diagram of a portion of the receiver station of the system shown in FIG. 2.

FIG. 4 is a logic diagram of a portion of the receiver station of the system shown in FIG. 2, comprising mainly the delay register 108, coding network 109, and syndrome analyzer 200. The delay register 108 is composed of a tandem connection comprising N synchronous delay stages provided with a modulo-two gate 400 which is connected between the $21^{st}$ and the $22^{nd}$ delay stage. The coding network 109 is identical to coding network 106.

The syndrome analyzer 100 comprises a syndrome register 401 which is composed of the tandem connection of 21 synchronous delay stages. The input of the first delay stage is connected to the output of modulo-two gate 112 which supplies the syndrome digits. The syndrome register 401 is provided with a reset input 402. This reset input is shown as an input of the last delay stage, but it is to be understood that a reset signal applied to this input changes all digits in the syndrome register to zeros.

Connected to the stages of the syndrome register 401 and to the input thereof is a pattern-recognition unit 403 which is provided with three outputs 404, 405 and 406. The pattern-recognition unit 403 serves for recognition of given patterns of zeros and ones in the 22 digits which are applied. Output 404 supplies a signal when the first characteristic sequence appears. Output 405 supplies a signal when the second characteristic sequence appears, and output 406 supplies a signal when a sequence of 22 zeros appears, said sequence being denoted as the zero sequence. Pattern-recognition unit 403 can be realized by those skilled in the art by using simple logic elements and will, therefore, not be described in detail in this context.

The output of the last stage of syndrome register 401 is connected to an input of a logic gate 407. The outputs 404 and 405 of pattern-recognition unit 403 are each connected to an inverted input of gate 407. The output of gate 407 is connected to the line 202 to switch controller 201, and the output 406 of pattern-recognition unit 403 is connected to line 203 to switch controller 201.

The logic gate 407 supplies an output signal if a signal is applied to the input and no signals are applied to the inverted inputs. In this context and hereinafter it is to be understood that a signal corresponds to the presence of a first logic signal level, the absence of a signal corresponding to the presence of a second logic signal level, the digit one being represented by the first logic signal level and the digit zero by the second logic signal level. Consequently, logic gate 407 supplies a signal if the digit in the last stage of the syndrome register 401 is a one and the first and the second characteristic sequence are not recognized. The signal of gate 407 is taken as an indication of the beginning of an error burst. The digit position of a first one of the syndrome sequence is denoted in the foregoing by $i$. The syndrome digit $s_i$ appears on the output of the last stage of the syndrome register 401 in digit position $i$+21. The beginning of an error burst is indicated by logic gate 407 by a signal in digit position $i+21$.

The output 406 of pattern-recognition unit 403 is connected to the line 203 to switch controller 201. The digit position of a first zero of the syndrome seqeunce is denoted in the foregoing by $j$. The syndrome digit $s_j$ appears on the output of the last stage of the syndrome register in the digit position $j+21$. A first zero of the syndrome sequence is indicated by output 406 by a signal in digit position $j+21$.

The output 404 of pattern-recognition circuit 403 and the line 204 of switch controller 201 are each connected to an input of a logic gate 408. This gate supplies a signal if a signal is applied to both inputs. The output of gate 408 is connected to the line 205 to the delay register 108 and is connected, via a circuit 409, to the reset input 402 of the syndrome register. The circuit 409 converts the change-over from the absence of a signal to the presence of a signal into an appropriately delayed reset signal for resetting the syndrome register. The line 205 is connected to modulo-two gate 400.

A description will first be given of the execution of the correction algorithm for random errors. The digit position of a first single error is denoted by $k$. The syndrome digit $s_k$ appears in digit position $k+21$ on the output of the last stage of syndrome register 401. In this last digit position output 404 of pattern-recognition circuit 403 supplies a signal if, as is assumed, the single error appears in the first communication channel. This signal prevents gate 407 from supplying a signal and inhibits the correction algorithm for error bursts. Line 204 carries a signal if the correction algorithm for error bursts is not being executed. It is assumed that line 204 carries a signal, in which case gate 408 supplies a signal in the digit position $k+21$. This signal, representing a one, is applied via line 205 to modulo-two gate 400 in which the one is added to the digit appearing on the output of the $21^{st}$ stage of the delay register. The latter digit is the digit $x'_k$, which is to say the digit in which the single error has occurred. By addition of a one to $x'_k$ , the error is corrected according to the relation:

$$x'_k + 1 = x_k + e_{1,k} + 1 = x_k$$

in which $e_{1,k} = 1$ represents the single error. The digit appearing in digit position $k+22$ on the output of the $22^{nd}$ stage of the delay register 408 is the corrected digit $x_k$.

The reset signal which is applied via circuit 409 to the syndrome register 401 sets all digits in the syndrome register to zeros and ensures that the last digit of the first characteristic sequence, the said digit being a one and appearing in digit position $k+21$ on the input of the syndrome register, is received as a zero by the syndrome register. A single error occurring in the digit position $k+22$ or later, is corrected in the same manner as the single error in digit position $k$. The foregoing is applicable to single first errors appearing in the first communication channel. Single errors which occur in the second communication channel are not corrected. The signalling of these errors on output 405 of pattern-recognition circuit 403 is exclusively used for inhibiting the correction algorithm for error bursts.

Figure 5:
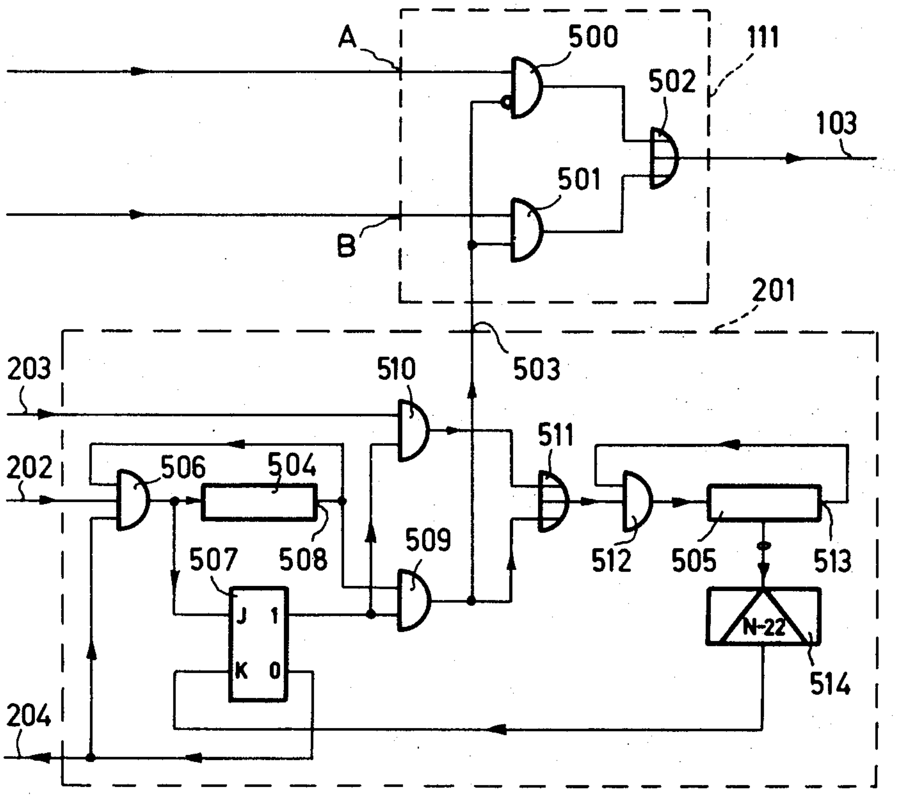

FIG. 5 i a logic diagram of a portion of the system shown in FIG. 2, comprising mainly the switching unit 111 and the switch controller 201. The switching unit 111 comprises two logic gates 500 and 501 and an OR-gate 502 which are connected in a manner which needs no further explanation. An inverted input of gate 500 and an input of gate 501 are connected to an output 503 of switch controller 201. This output normally supplies no signal, so that gate 500 is normally operative and gate 501 is inoperative. This corresponds to position A. The switching unit is in position B when output 503 supplies a signal.

The switch controller 201 comprises two synchronous counters 504 and 505, the first counter comprising N−42 counting positions and the second counter comprising N−21 counting positions. In the starting position of the switch controller, the counters are in the counting position O. Logic gate 506 has an input which is connected to line 202, an input which is connected to the O-output of a JK-flipflop 507, and an input which is connected to an output 508 of counter 504. The output of gate 506 is connected to an input of counter 504. Gate 506 supplies a signal if a signal is applied to all inputs. Output 508 of counter 504 supplies a signal if the counter is in counting position O, and the O-output of JK-flipflop 507 supplies a signal if the flipflop is in position O. In the starting position of the switch controller counter 504 is in counting position O and JK-flipflop 507 is in position O. It is assumed that a signal is received from line 202 at an instant at which the switch controller is in the starting position. This signal indicates the beginning of an error burst. The digit position of the signal is denoted in the foregoing by $i+21$. In this digit position a signal is applied to all inputs of gate 506 and this gate supplies a signal to counter 504. As a result, the counter is started and completes one counting cycle. This counting cycle starts with counting position 1 in digit position $i+22$ and terminates with counting position O in the digit position $i+N-21$. As of this digit position, counter 504 remains in the counting position O. The output of gate 506 is also connected to the J-input of flipflop 507, so that the latter is set to position 1 at the beginning of digit position $i+22$. The O-output removes the signal from the input of gate 506, so that counter 504 cannot be started again by a signal received from line 202 as long as flipflop 507 is in the position 1. Line 204, extending from switch controller 201 to syndrome analyzer 200, is connected to the O-output of flipflop 507 and, consequently, carries no signal from digit position $i+22$ till the instant at which flipflop 507 is reset to position O. The absence of a signal on line 204 inhibits the correction algorithm for random errors as described.

A logic gate 509 has an input which is connected to output 508 of counter 504, and an input which is connected to the 1-output of flipflop 507. The output of gate 509 forms the output 503 of the switch controller. Gate 509 supplies a signal if a signal is applied to all inputs. This is the case as of digit position $i+N-21$ in which the counter is reset to counting position O. Output 503 then carries a signal as of the beginning of the digit position $i+N-21$, said signal setting switching unit 111 to position B. The description given thus far corresponds to the first portion (11.1) of the adaptive switch-over procedure and to the beginning of the second portion (11.2) thereof.

An AND-gate 510 has an input which is connected to line 203, and an input which is connected to the 1-output of flipflop 507. the output of gate 510 is connected to an input of an OR-gate 511. A logic gate 512 has an input which is connected to the output of OR-gate 511, and an input which is connected to the output 513 of counter 505. The output of gate 512 is connected to an input of counter 505. The output 513 of counter 505 supplies a signal if the coutner is in the counting position O. It is assumed that a signal is received from line 203 at an instant at which counter 504 has been started and counter 505 is in counting position O. This signal indicates the end of the error burst. The digit position of this signal is denoted in the foregoing by $j$+21. In this digit position the gates 510, 511 and 512 supply a signal. Gate 512 applies a signal to counter 505 so that the latter starts to perform one counting cycle. This cycle starts with counting position 1 in digit position $j$+22 and terminates with counting position O in digit position $j$+N. A decoder 514 for the counting position N−22 is connected to counter 505. Counter 505 reaches the counting position N−22 in the digit position $j$+N−1. The output of decoder 514 is connected to the K-input of flipflop 507. Decoder 514 supplies a signal in digit position $j$+N−1 to the K-input so that flipflop 507 is set to position O at the beginning of the digit position $j$+N. The 1-output removes the signal from the input of gate 509 so that the latter removes the signal from output 503. As a result, the switching unit 111 is reset to position A. This corresponds to the end of the second portion (11.2) of the adaptive switch-over procedure. The switch-controller is then in the starting position and supplies a signal to line 204 which cancels the inhibition of the correction algorithm for random errors.

If no signal is received from line 203 before digit position $i$+N−21, counter 505 is started in digit position $i$+N−21 by the signal from gate 509 via OR-gate 511. In that case the fixed switch-over procedure according to (7.2) is obtained, in which $q$ is chosen to be equal to N−21.

We claim:

1. An error-correcting data transmission system, comprising a data source, a two-channel transmitter, a two-channel receiver, a data collector and a transmission path between the transmitter and the receiver, means connecting the data source to the input of a first channel of the transmitter, a first delay register means connecting the data source to an input of the first delay register, a first linear sequential coding network comprising forward-coupling paths means connecting the data source to an input of the first linear sequential coding network, a first modulo-two adder, the output of the first delay register and the output of the first coding network being connected to the first modulo-two adder, the output of the first modulo-two adder being connected to the input of the second channel of the transmitter, a second delay register, means connecting the output of the first channel of the receiver to the input of the second delay register, the second delay register having the same delay time as the first delay register, a second coding network, means connecting the first output of the receiver to the input of the second coding network, the second coding network having the same transfer function as the first coding network, a second modulo-two adder, the output of the second channel of the receiver and the output of the second coding network being connected to the second modulo-two adder, a third modulo-two adder, the output of the second delay register and the output of the second modulo-two adder being connected to the third modulo-two adder, a two-position switching unit means for connecting the data collector to the output of the second delay register in a first position thereof, and for connecting the data collector to the output of the second modulo-two adder in a second position thereof, and a control unit means provided with an input for the syndrome digits supplied by the third modulo-two adder, for temporarily setting the switching unit to the second position after expiration of a predetermined period of time after the instant of appearance of an indication of the beginning of an error burst, the control unit comprising a syndrome register which receives the syndrome digits as its input signal, a pattern-recognition unit means connected to the syndrome register for providing separate indications corresponding to, firstly, simple error patterns, in particular single errors in the first receiver channel, secondly, simple error patterns, in particular single errors in the second channel of the receiver and, thirdly, error bursts, an error correction circuit means responsive to the indication of a simple error pattern in the first receiver channel for correcting a digit in the second delay register which is affected by the indicated error pattern.

2. An error-correcting data transmission system as claimed in claim 1, wherein the pattern recognition unit comprises means for detecting and indicating a first characteristic sequence of syndrome digits, corresponding to the response of the coding network to a binary one which is followed by binary zeros, means for detecting a second characteristic sequence of a binary one which is followed by binary zeros, and means for detecting the zero sequence which comprises binary zeros only, the indication of the beginning of an error burst being formed by the presence of a binary one in the last stage of the syndrome register if this one does not form part of a first or second characteristic sequence.

3. An error-correcting data transmission system as claimed in claim 1, wherein the pattern-recognition unit comprises means for detecting and indicating the zero sequence which comprises binary zeros only, wherein the control unit is provided with an input for receiving the indication of the zero sequence, and wherein the control unit further comprises timing means for resetting the switching unit to the first position after expiration of a predetermined period of time after the instant of appearance of the indication of the zero sequence.

* * * * *

PO-1050
(5/69)

UNITED STATES PATENT OFFICE
CERTIFICATE OF CORRECTION

Patent No. 3,781,795 Dated December 25, 1973

Inventor(s) LEO EDUARD ZEGERS

It is certified that error appears in the above-identified patent and that said Letters Patent are hereby corrected as shown below:

IN THE SPECIFICATION

Col. 4, line 4, "whcih" should be --which--;

Col. 6, line 54, "re-gister" should be --register--;

line 59, "18" should be --108--;

Col. 11, line 4, "casee" should be --case--;

Col. 14, line 59, ". the" should be --. The--;

Signed and sealed this 17th day of September 1974.

(SEAL)
Attest:

McCOY M. GIBSON JR.
Attesting Officer

C. MARSHALL DANN
Commissioner of Patents